Feb. 16, 1926. Re. 16,269

E. L. SMALLEY

ELECTRIC FURNACE

Original Filed August 6, 1920 2 Sheets-Sheet 1

INVENTOR
EDWIN L. SMALLEY
Conrad A. Dietrich
his ATTORNEY

Feb. 16, 1926. Re. 16,269

E. L. SMALLEY

ELECTRIC FURNACE

Original Filed August 6, 1920 2 Sheets-Sheet 2

INVENTOR
EDWIN L. SMALLEY

BY Conrad A. Dietemann
his ATTORNEY

Reissued Feb. 16, 1926. Re. 16,269

UNITED STATES PATENT OFFICE.

EDWIN L. SMALLEY, OF MILWAUKEE, WISCONSIN, ASSIGNOR TO ELECTRIC HEATING APPARATUS COMPANY, OF NEWARK, NEW JERSEY.

ELECTRIC FURNACE.

Original No. 1,459,801, dated June 26, 1923, Serial No. 401,717, filed August 6, 1920. Application for reissue filed June 22, 1925. Serial No. 38,927.

*To all whom it may concern:*

Be it known that I, EDWIN L. SMALLEY, a citizen of the United States, and a resident of Milwaukee, in the county of Milwaukee and State of Wisconsin, have invented certain new and useful Improvements in Electric Furnaces, of which the following is a specification.

This invention relates to electric furnaces, and my improvement is directed to certain novel means of supporting and engaging the heating elements thereof against the interior surfaces of such furnaces.

Particularly in the instance of a furnace having a housing composed of bricks of pressed infusorial earth, or of other suitable material which is a non-conductor of electricity, my invention comprehends the integral formation with said bricks, at their surface exposed to the furnace, interior, of reception means for the resistance conductors constituting the heating units, and with said reception means I provide locking means to retain the heating units in such engagement and positively hold them compacted snugly against the interior surfaces of the furnace.

As an example of my invention I form upon the housing bricks, at their surfaces which are to be exposed to the furnace interior, a series of projections, or bosses, arranged in spaced relation, and in separated groups and tiers of groups, so that parallel strands of a resistor, may be lodged between adjacent projections or bosses, and pins of porcelain or other suitable material which is a non-conductor of electricity are then entered within aligned holes that extend through each series of said projections or bosses, beyond the lodged resistor strands, to prevent extrusion thereof.

Other features and advantages of my invention will hereinafter appear.

In the drawings:—

Fig. 3 is a front view thereof, reduced, and

Fig. 4 is a detail of a modification.

Figure 1:
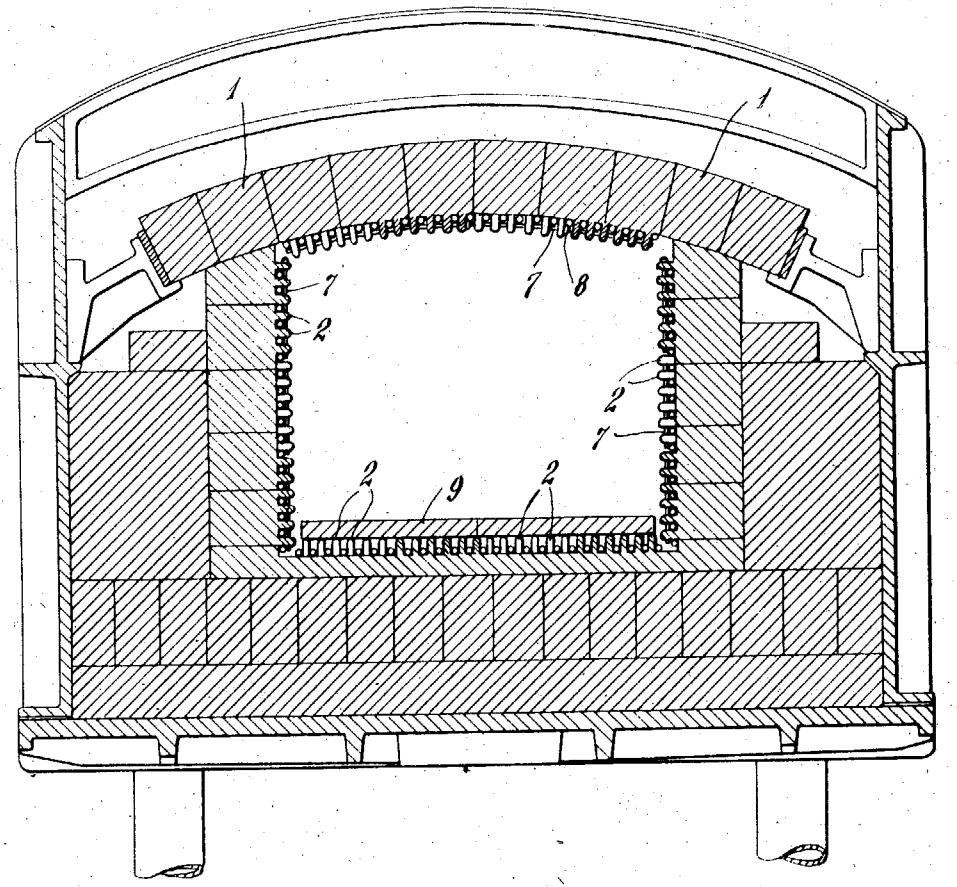
Figure 1 is a front sectional elevation of a furnace equipped with my improved resistor lodgement and securing means.
Figure 2:
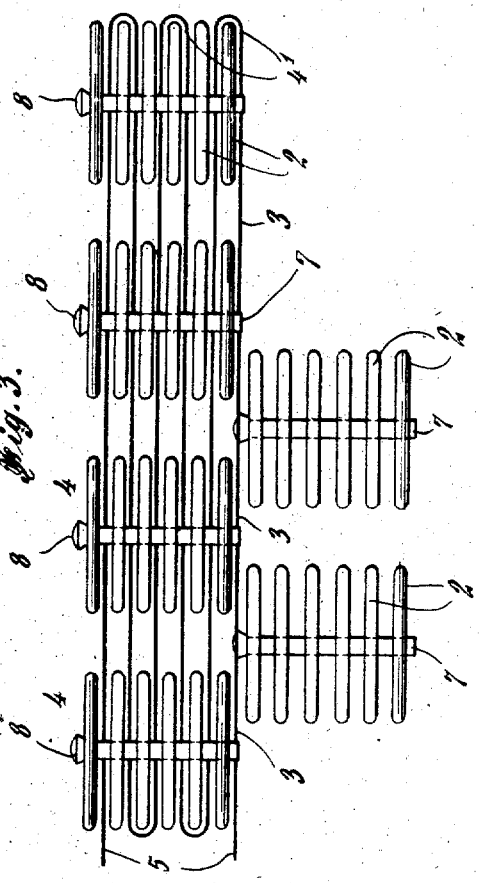
Fig. 2 is an enlarged, detail side view in section of the resistor lodgement and securing means.
Figure 2:
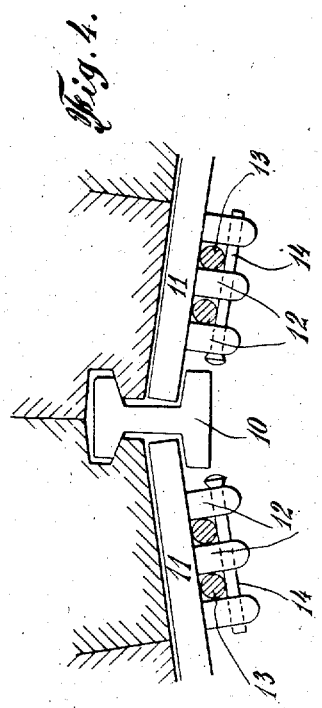
Figure 2:
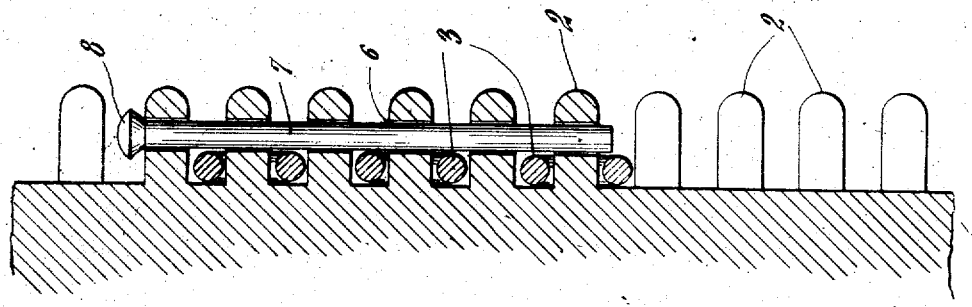

In the example of an electrical furnace illustrated in Fig. 1, it is seen to include the housing brick 1, whose surface is exposed to the furnace interior.

Usually the heating elements, as resistance conductors in the form of coils of return bend or other character, have been carried by unit refractories or plates with which the interior surface of the furnace is lined, but with the aid of my present improvement I am able to dispense with all such lining plates. Instead I provide the housing brick itself with projections or bosses 2, arranged in groups, and directed towards the furnace interior. The projections or bosses in each group are spaced apart sufficiently for the lodgement, between adjacent projections or bosses, of a resistor strand, and if the resistor is of the return bend type, having parallel strands 3, as here shown, then the interspaces separating the projections or bosses in a group will coincide with the spaced arrangement of the strands, and thus will receive said strands, which are thereby respectively supported and insulated one from another.

The groups of projections or bosses 2 are only arbitrarily indicated in the drawing as each including six projections or bosses for the containment of a return bend coil having that number of strands, but obviously said number may be varied. As represented in Fig. 3, a number of groups, 4, of said projections or bosses are provided, in lateral spaced arrangement, with their respective projections or bosses and interspaces aligned, so that a lateral series of said groups will unitedly support all the strands of a complete return bend coil throughout the full length thereof.

Thus the upper tier of groups 4 of Fig. 3 is shown as containing the heating element 3, having the bends 4′, that extend around the respective projections or bosses at one end of the tier, while the terminals 5 project from the other end, for inclusion in an electrical circuit (not shown) according to usual furnace practice.

The projections or bosses in a group are provided with aligned orifices 6, which extend therethrough in parallelism with the housing surface, spaced therefrom sufficiently to clear the contained resistor strands, and a pin or the like 7 of porcelain or other suitable material that is a non-conductor of electricity, is removably entered in said aligned orifices, to thus comprise a guard or lock to retain the resistor or heating element in its lodged position. Said pin 7 is shown as having a head 8 to serve as a stop in coaction with the uppermost projection or boss, and to permit its withdrawal for the removal of the resistor.

When there is more than one tier of groups 4 in a single plane, the groups of adjacent tiers are disposed in staggered relation, as per the example in Fig. 3, where two of such tiers are shown, because by this means the pin 7 in a lower tier are thereby rendered capable of withdrawal through the spaces separating adjacent groups of an upper tier.

In Fig. 1 the surfaces of the side walls of the furnace housing are shown as provided with exposed heating elements, lodged and locked in position in the manner described, and the same is also true of the upper and lower surfaces of the housing interior, excepting that the heating element in the bottom surface, with its lodging and retaining means, may, when desirable, be covered by a refractory plate, as indicated at 9 in said figure.

It should also be noted that in the cases where more than one tier of groups are employed, in the staggered relation referred to, the adjacent projections or bosses of succeding tiers provide between them the lodgement spaces for a final strand in a resistor element.

It will be appreciated that by the herein described means of securing resistance conductors in exposed relation against the surface of the housing brick, early heating effect is provided, and also the contingency of broken unit refractories, thus needing replacement, is eliminated.

The projections or bosses provided upon the surface of the housing brick may be formed integrally therewith, but may instead be in the form of separate members, having suitable means of engagement with the housing. Thus, in Fig. 4, I have shown supporting means 10 like those employed in my Patent No. 1,346,854. Plates, as 11, are carried by support 10, said plates having the projections or bosses 12, which receive between them the resistors 13, and pins 14 are entered through orifices provided therefor in said projections or bosses, to retain the resistors in their lodged position.

Variations within the spirit and scope of my invention are equally comprehended herein by virtue of the foregoing disclosure.

I claim:

1. An electric furnace comprising a support of refractory material, a preformed return-bend resistor element disposed upon said support in exposed relation to the interior space of the furnace, and refractory members carried by said support and adapted to engage said resistor element to retain the same in position in close proximity to said support and to permit of the ready removal of said element, substantially as specified.

2. An electric furnace comprising a support of refractory material, a preformed return-bend resistor element associated therewith in exposed relation to the interior space of the furnace, and spaced elongated refractory members carried by said support, and extending transversely of the strands of said resistor element over opposite portions thereof whereby to retain the same in position with respect to said support; said refractory members and said resistor element being arranged to permit of the ready removal of said resistor element; substantialy as specified.

3. An electric furnace comprising a support having channels formed thereon, a resistor element disposed in said channels, and adapted to be readily removed therefrom, and a plurality of retaining means arranged in spaced relation on said support, and adapted to engage opposite end portions of said resistor element to retain the same in said channels; said retaining means and said resistor element being arranged to permit of the ready removal of said element, substantially as specified.

4. An electric furnace comprising a support having channels formed thereon, a resistor element disposed in said channels, and members extending transversely of said channels at opposite ends thereof and adapted to engage opposite portions of said resistor element to retain the same in said channels; said retaining members and said resistor element being arranged to permit of the ready removal of said resistor element from said channels, substantially as specified.

5. An electric furnace comprising a refractory support, a preformed return-bend resistor element disposed upon said support, and a plurality of retaining means arranged in spaced relation on said support, and extending transversely of the strands of said resistor element in engagement with opposite portions thereof to retain the same in position in close proximity to said support; said retaining means serving to permit of the ready removal of said resistor element, substantially as specified.

6. An electric furnace comprising a wall of refractory material, a preformed return-bend resistor element associated therewith and exposed to the interior space of the furnace, retaining members carried by said wall and adapted to engage said resistor element to retain the same in position with respect to said wall, and means interposed between successive strands of said element to maintain said strands in spaced relation, substantially as specified.

7. An electric furnace comprising a wall of refractory material, a preformed return-bend resistor element disposed relatively to said wall in exposed relation to the interior space of the furnace, refractory members carried by said wall and adapted to engage said element to retain the same in operative position relatively to said wall and to permit of the ready removal of said element, and means interposed between successive strands of said element to maintain said strands in spaced relation, substantially as specified.

8. An electric furnace comprising a support of refractory material, a plurality of spaced refractory members projecting from said support, a preformed return-bend resistor element disposed upon said support with the strands thereof received between said projecting refractory members, and refractory members carried by said support, and adapted to engage said resistor element for retaining the same in position in close proximity to said support, and serving to permit of the ready removal of said element, substantially as specified.

9. In an electric furnace, in combination, a refractory support, a group of members projecting from said support, a return-bend heating element disposed upon said support with the strands thereof received between said projecting members; said projecting members being spaced to permit of said heating element being readily moved relative to said projecting members towards and from said support, and a plurality of spaced retaining means carried by said support and extending over and adapted to engage opposite portions of said heating element, and serving to retain the same in position with said strands disposed between said projecting members and to permit of the removal of said heating element from between said projecting members, substantially as specified.

10. In an electric furnace, in combination, a support, a plurality of spaced members projecting from said support, a return-bend heating element disposed upon said support with the strands thereof received between said projecting members, and members removably engaging said projecting members, and extending across said heating element to retain the same in position on said support, substantially as specified.

11. In an electric furnace, in combination, a refractory support, a plurality of spaced refractory members projecting from said support, a return-bend heating element disposed upon said support with the strands thereof disposed between said projecting refractory members, and refractory members extending transversely of said strands and removably disposed within said projecting refractory members for retaining said heating element on said support in exposed relation to the interior of said furnace, substantially as specified.

12. An electric furnace having its housing exposed to the furnace interior, means engageable with the housing for the removable lodgement of an inwardly uncovered resistance conductor, and movable securing means for said conductor.

13. In an electric furnace, in combination, a housing whose inner surface is exposed to the furnace interior, a return-bend heating element having parallel strands, a group of spaced bosses upon said housing surface, whereof adjacent bosses permit the lodgement between them of said strands respectively, and removable means to secure said strands in their lodgement.

14. In an electric furnace, in combination, a housing whose inner surface is exposed to the furnace interior, a return-bend heating element having parallel strands, a group of spaced bosses upon said housing surface, whereof adjacent bosses permit the lodgement between them of said strands, respectively, said bosses having aligned orifices, and a pin of non-conductive material removably entered in said orifices to retain said strands in their lodged position.

15. In an electric furnace, in combination, a housing whose inner surface is exposed to the furnace interior, a return bend resistance conductor having parallel strands, laterally separated groups of spaced bosses upon said housing surface, adjacent bosses in each group being aligned to afford lodgement between them for a conductor strand in exposed relation, and removable securing means for said strand 16. In an electric furnace, in combination, a housing whose inner surface is exposed to the furnace interior, return bend resistance conductors having parallel strands, tiers of laterally separated groups of spaced bosses upon said housing surface, whereof adjacent bosses in each group are aligned to afford lodgement between them for a conductor strand in exposed relation, each group of bosses having aligned orifices, a removable lock pin for said strands in said orifices, and the groups of bosses in said tiers being staggered for the entry and removal of said pins.

Signed at Pittsburgh in the county of Allegheny and State of Penns., this 18th day of June, 1925.

EDWIN L. SMALLEY.